United States Patent
Li et al.

(10) Patent No.: US 10,207,190 B2
(45) Date of Patent: Feb. 19, 2019

(54) TECHNOLOGIES FOR NATIVE GAME EXPERIENCE IN WEB RENDERING ENGINE

(71) Applicant: Intel Corporation, Santa Clara, CA (US)

(72) Inventors: Guangzhen Li, Shanghai (CN); Zhongsong Lin, Shanghai (CN); Chun Gao, Shanghai (CN); Ningxin Hu, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 144 days.

(21) Appl. No.: 14/974,671

(22) Filed: Dec. 18, 2015

(65) Prior Publication Data

US 2017/0173467 A1    Jun. 22, 2017

(51) Int. Cl.
| | |
|---|---|
| *A63F 13/77* | (2014.01) |
| *G06F 21/12* | (2013.01) |
| *G06F 21/53* | (2013.01) |
| *G06F 9/455* | (2018.01) |
| *G06F 17/30* | (2006.01) |

(Continued)

(52) U.S. Cl.
CPC .............. *A63F 13/77* (2014.09); *A63F 13/30* (2014.09); *A63F 13/50* (2014.09); *G06F 3/0481* (2013.01); *G06F 9/455* (2013.01); *G06F 9/45508* (2013.01); *G06F 9/541* (2013.01); *G06F 17/30899* (2013.01); *G06F 21/128* (2013.01); *G06F 21/53* (2013.01); *G06T 1/20* (2013.01); *H04L 67/02* (2013.01);

(Continued)

(58) Field of Classification Search
None
See application file for complete search history.

(56) References Cited

U.S. PATENT DOCUMENTS

| | | |
|---|---|---|
| 8,797,337 B1 | 8/2014 | Labour |
| 2010/0118038 A1* | 5/2010 | Labour ................. G06F 9/4443 345/522 |

(Continued)

OTHER PUBLICATIONS

International Search Report for PCT/US16/062786, dated Feb. 27, 2017 (3 pages).

(Continued)

*Primary Examiner* — Jason Yen
(74) *Attorney, Agent, or Firm* — Barnes & Thornburg LLP (57) ABSTRACT

Technologies for web-based game execution include a computing device with a web rendering engine and a native game engine library. The web rendering engine establishes a scripting environment that issues calls to a game engine interface established by the web rendering engine. The scripting environment may be a JavaScript engine. In response to calls to the game engine interface, the game engine interface issues calls to the native game engine library. The native game engine library issues native graphics commands to a graphics bridge of the computing device. The native graphics commands may be OpenGL calls. The graphics bridge translates the native graphics commands to a web graphics context, which renders graphical game content to a web content element of the web rendering engine. The web graphics context may be a WebGL context, and the web content element may be a canvas element. Other embodiments are described and claimed.

23 Claims, 4 Drawing Sheets

(51) Int. Cl.
  *G06F 9/54* (2006.01)
  *A63F 13/30* (2014.01)
  *A63F 13/50* (2014.01)
  *G06F 3/0481* (2013.01)
  *G06T 1/20* (2006.01)
  *H04L 29/08* (2006.01)

(52) U.S. Cl.
  CPC ... *A63F 2300/209* (2013.01); *A63F 2300/552* (2013.01); *A63F 2300/6009* (2013.01)

(56) References Cited

U.S. PATENT DOCUMENTS

| | | |
|---|---|---|
| 2010/0118039 A1 | 5/2010 | Labour |
| 2013/0120418 A1* | 5/2013 | Green .................. G06T 15/005 345/522 |
| 2014/0136954 A1 | 5/2014 | Ligman et al. |
| 2014/0157246 A1* | 6/2014 | Tomlinson ................ G06F 8/47 717/140 |
| 2015/0094150 A1* | 4/2015 | Gregory .................. A63F 13/12 463/42 |
| 2015/0195106 A1* | 7/2015 | Sehr .................... G06F 12/1458 709/206 |
| 2016/0001187 A1* | 1/2016 | Sepulveda .............. A63F 13/77 463/31 |

OTHER PUBLICATIONS

Written Opinion for PCT/US16/062786, dated Feb. 27, 2017 (7 pages).

\* cited by examiner

TECHNOLOGIES FOR NATIVE GAME EXPERIENCE IN WEB RENDERING ENGINE

BACKGROUND

Web sites, web applications, and other web-based technologies have become pervasive parts of modern computing. Typical web browsers support rendering interactive applications using a combination of various textual markup languages, stylesheets, and scripting languages such as JavaScript. In particular, current web browsers may support rendering web applications developed using HTML5 and related technologies, including support for various types of multimedia, graphics, sound, and network communication protocols.

Games are popular applications for many computer systems. Accordingly, various types of game engines have been developed to provide common functionality typical for games, including graphics (e.g., two-dimensional graphics such as sprites and/or three-dimensional graphics), user input processing, game state management, and other functions. Many modern games are web-based and execute in a web browser or similar web rendering engine. Multiple approaches have been used to incorporate game engines into web-based games. For example, certain web-based games include a game engine implemented using a web scripting language such as JavaScript. As another example, web-based games may communicate with an out-of-process game engine using an interprocess communication/message passing interface such as the Google® Native Client (NaCl) interface. As still another example, certain games include a native game engine that is bound to a dedicated JavaScript engine and associated interface, such as Cocos2D-JSB, without incorporating a full web rendering engine.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

Figure 1:
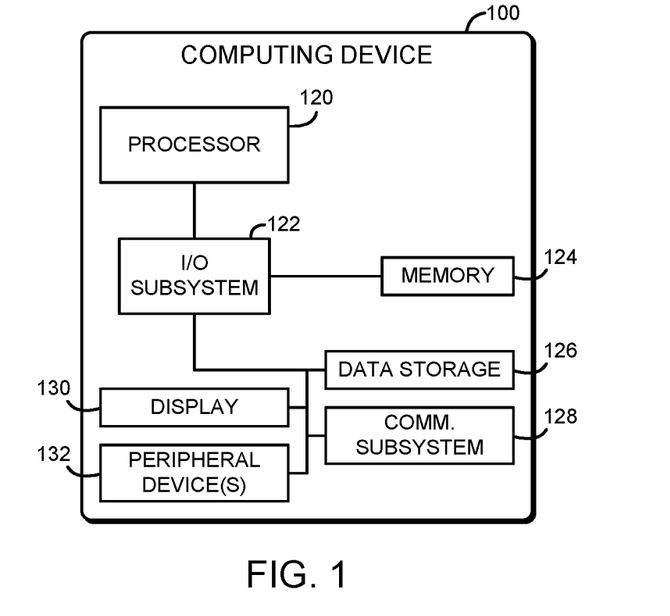
FIG. 1 is a simplified block diagram of at least one embodiment of a computing device for web-based game execution.

Referring now to FIG. 1, in an illustrative embodiment, a computing device 100 for web-based game rendering includes a web content rendering engine such as a web browser. The web rendering engine executes a game using web technologies such as HTML5 and JavaScript. The game accesses a game engine object model established by the web rendering engine, which in turn accesses a game engine web API established by the web rendering engine. The game engine web API accesses a native game engine library of the computing device 100, which renders game content by generating native graphics library calls such as OpenGL calls. A native-to-web graphics bridge established by the web rendering engine translates the native graphics library calls into a web graphics context, such as a WebGL context. The web graphics context renders game content using the web content rendering engine, for example by rendering the game content onto an HTML5 canvas element. Thus, the computing device 100 may provide near-native game execution speeds and framerates while also allowing the web-based game to access web-based technologies and APIs provided by the web content rendering engine (such as a full document object model, cascading style sheets support, and other HTML5 features). In particular, the computing device 100 may improve performance by executing the game engine natively rather than using a dynamically typed, garbage-collected web scripting language such as JavaScript. Additionally, the computing device 100 may execute the native game engine library without potentially expensive inter-process communication and/or message passing interfaces associated with out-of-process game engines. Thus, web-based games may be executed with satisfactory performance even on relatively inexpensive hardware, such as mid- to low-range mobile phones.

The computing device 100 may be embodied as any type of computation or computer device capable of performing the functions described herein, including, without limitation, a computer, a tablet computer, a mobile computing device, a wearable computing device, a desktop computer, a laptop computer, a notebook computer, a server, a workstation, a network appliance, a web appliance, a distributed computing system, a processor-based system, and/or a consumer electronic device. As shown in FIG. 1, the computing device 100 illustratively includes a processor 120, an input/output subsystem 122, a memory 124, a data storage device 126, and communication circuitry 128. Of course, the computing device 100 may include other or additional components, such as those commonly found in a laptop computer (e.g., various input/output devices), in other embodiments. Additionally, in some embodiments, one or more of the illustrative components may be incorporated in, or otherwise form a portion of, another component. For example, the memory 124, or portions thereof, may be incorporated in the processor 120 in some embodiments.

The processor 120 may be embodied as any type of processor capable of performing the functions described herein. The processor 120 may be embodied as a single or multi-core processor(s), digital signal processor, microcontroller, or other processor or processing/controlling circuit. Similarly, the memory 124 may be embodied as any type of volatile or non-volatile memory or data storage capable of performing the functions described herein. In operation, the memory 124 may store various data and software used during operation of the computing device 100 such as operating systems, applications, programs, libraries, and drivers. The memory 124 is communicatively coupled to the processor 120 via the I/O subsystem 122, which may be embodied as circuitry and/or components to facilitate input/output operations with the processor 120, the memory 124, and other components of the computing device 100. For example, the I/O subsystem 122 may be embodied as, or otherwise include, memory controller hubs, input/output control hubs, platform controller hubs, integrated control circuitry, firmware devices, communication links (i.e., point-to-point links, bus links, wires, cables, light guides, printed circuit board traces, etc.) and/or other components and subsystems to facilitate the input/output operations. In some embodiments, the I/O subsystem 122 may form a portion of a system-on-a-chip (SoC) and be incorporated, along with the processor 120, the memory 124, and other components of the computing device 100, on a single integrated circuit chip.

The data storage device 126 may be embodied as any type of device or devices configured for short-term or long-term storage of data such as, for example, memory devices and circuits, memory cards, hard disk drives, solid-state drives, or other data storage devices. The communication circuitry 128 of the computing device 100 may be embodied as any communication circuit, device, or collection thereof, capable of enabling communications between the computing device 100 and other remote devices (such as web servers) over a network. The communication circuitry 128 may be configured to use any one or more communication technology (e.g., wired or wireless communications) and associated protocols (e.g., Ethernet, Bluetooth®, Wi-Fi®, WiMAX, etc.) to effect such communication.

The computing device 100 may also include a display 130 and one or more peripheral devices 132. The display 130 may be embodied as any type of display capable of displaying digital information such as a liquid crystal display (LCD), a light emitting diode (LED), a plasma display, a cathode ray tube (CRT), or other type of display device. The peripheral devices 132 may include any number of additional input/output devices, interface devices, and/or other peripheral devices. For example, in some embodiments, the peripheral devices 132 may include a touch screen, graphics circuitry, game controller, keyboard, mouse, speaker system, microphone, network interface, and/or other input/output devices, interface devices, and/or peripheral devices.

Figure 2:
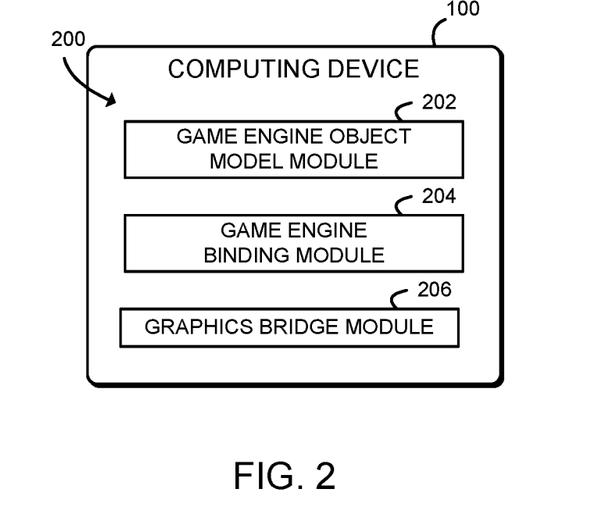
FIG. 2 is a simplified block diagram of at least one embodiment of an environment that may be established by the computing device of FIG. 1.

Referring now to FIG. 2, in an illustrative embodiment, the computing device 100 establishes an environment 200 during operation. The illustrative environment 200 includes a game engine object model module 202, a game engine binding module 204, and a graphics bridge module 206. The various modules of the environment 200 may be embodied as hardware, firmware, software, or a combination thereof. As such, in some embodiments, one or more of the modules of the environment 200 may be embodied as circuitry or collection of electrical devices (e.g., game engine object model circuitry 202, game engine binding circuitry 204, and/or graphics bridge circuitry 206). It should be appreciated that, in such embodiments, one or more of the game engine object model circuitry 202, the game engine binding circuitry 204, and/or the graphics bridge circuitry 206 may form a portion of one or more of the processor 120, the I/O subsystem 122, and/or other components of the computing device 100. Additionally, in some embodiments, one or more of the illustrative modules may form a portion of another module and/or one or more of the illustrative modules may be independent of one another.

The game engine object model module 202 is configured to issue, by a scripting environment established by a web rendering engine of the computing device 100, one or more calls to a game engine interface established by the web rendering engine. The calls to the game engine interface may include sprite commands, animation commands, input device commands, physics engine commands, three-dimensional animation commands, or other game engine commands. The game engine object model module 202 may be further configured to access, by the web scripting environment, a game engine object model established by the web scripting environment and issue the calls to the game engine interface in response to accessing the game engine object model. The game engine object model may be embodied as an abstracted model of the game engine interface that is adapted to the web scripting environment. The game engine object model module 202 may be further configured to execute game logic by the web scripting environment. The game logic may generate calls to the game engine interface as well as one or more calls to a web application programming interface established by the web rendering engine, such as a document object model, a web real-time communication interface, a web sockets interface, a web audio interface, or other web application programming interface. The web scripting environment may be embodied as a JavaScript engine.

The game engine binding module 204 is configured to issue one or more calls to a native game engine library of the computing device 100 in response to the calls issued to the game engine interface. The game engine binding module 204 may be configured to translate, by the game engine interface, the calls to the game engine interface into the calls to the native game engine library. The game engine binding module 204 is further configured to issue, by the native game engine library, one or more native graphics commands to a graphics bridge of the computing device 100 in response to the calls issued to the native game engine library. The native graphics commands may be embodied as, for example, OpenGL commands.

The graphics bridge module 206 is configured to translate, by the graphics bridge, native graphics commands received from the native game engine library to a web graphics context of the computing device 100. The web graphics context may be embodied as, for example, a WebGL context. The graphics bridge module 206 is further configured to render graphical game content to a web content element of the web rendering engine with the web graphics context based on the translated native graphics commands. The web content element may be embodied as a document element of a textual markup language document, such as an HTML5 canvas element. The web content element may be rendered by a web browser of the computing device 100, which may establish or otherwise host the web rendering engine.

Figure 3:
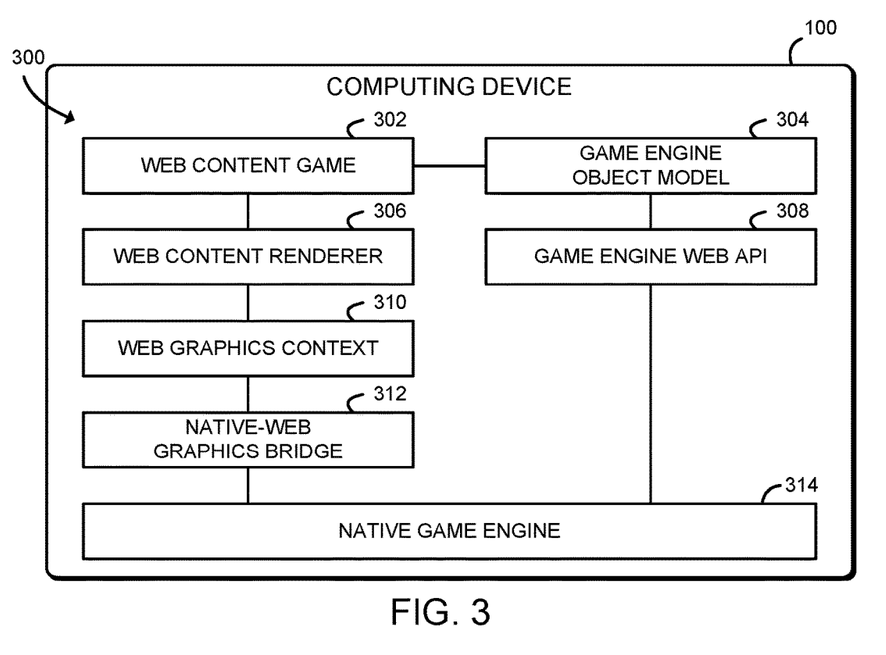
FIG. 3 is a simplified block diagram of at least one embodiment of a system architecture that may be established by the computing device of FIGS. 1-2.

Referring now to FIG. 3, in an illustrative embodiment, the computing device 100 establishes a system architecture 300 during operation. The illustrative system architecture 300 includes a web content game 302, a game engine object model 304, a web content renderer 306, a game engine web API 308, a web graphics context 310, a native-web graphics bridge 312, and a native game engine 314.

The web content game 302 may be embodied as any game that is executed by the web content renderer. The web content game 302 includes web-based content, such as hypertext documents, stylesheets, web script programs, images, and other web resources. The game engine object model 304 provides an object-oriented interface to an application programming interface (API) provided by the native game engine 314. The web content game 302 may access the game engine object model 304 to render graphical game content and to otherwise execute the game.

The web content renderer 306 may be embodied as any user application that renders web-based content, including hypertext documents, stylesheets, web script programs, images, and other web resources. In particular, the web content renderer 306 may provide a script engine or other execution environment for web scripts, including scripts provided by the web content game 302 and/or the game engine object model 304. Additionally, the web content renderer 306 may provide one or more document elements or other drawing surfaces that may be used to present graphical content to the user. For example, the web content renderer 306 may be embodied as a web browser, a stand-alone application with an embedded web view component, or any other user application that renders web pages and associated resources, including script files, images, sounds, and other resources.

The game engine web API 308 provides an application programming interface (API) to the native game engine 314 for web applications executed by the web content renderer 306. For example, the game engine web API 308 may be provide a web scripting language interface that closely parallels the API of the native game engine 314. In some embodiments, the game engine web API 308 may receive calls from web content such as the web content game 302 and/or the game engine object model 304 and in response generate corresponding calls to the native game engine 314.

The web graphics context 310 provides an interface for drawing graphics using the web content renderer 306. In some embodiments, the web graphics context 310 may support drawing two- or three-dimensional graphics to one or more document elements or other drawing surfaces provided by the web content renderer 306. The web graphics context 310 may support an interface that is similar to a native graphics library interface provided by the computing device 100. The native-web graphics bridge 312 translates between calls to a native graphics library interface and calls to the web graphics context 310.

The native game engine 314 provides a library of common functionality for games and may be embodied as one or more native code libraries, for example, as compiled C and/or C++ code. The native game engine 314 may provide support for managing game objects such as game scenes, game levels, game characters, transitions, animations, and other game objects. The native game engine 314 may also provide support for two-dimensional graphics and/or three-dimensional graphics, including sprites, particle effects, three-dimensional models and textures, and other graphical features. The native game engine 314 may render graphical game content by generating one or more calls to a native graphics library of the computing device 100. For example, the native game engine 314 may render game content by generating one or more OpenGL calls. In some embodiments, the native game engine 314 may provide additional game functionality such as user input management, physics modeling, and other game services.

Figure 4:
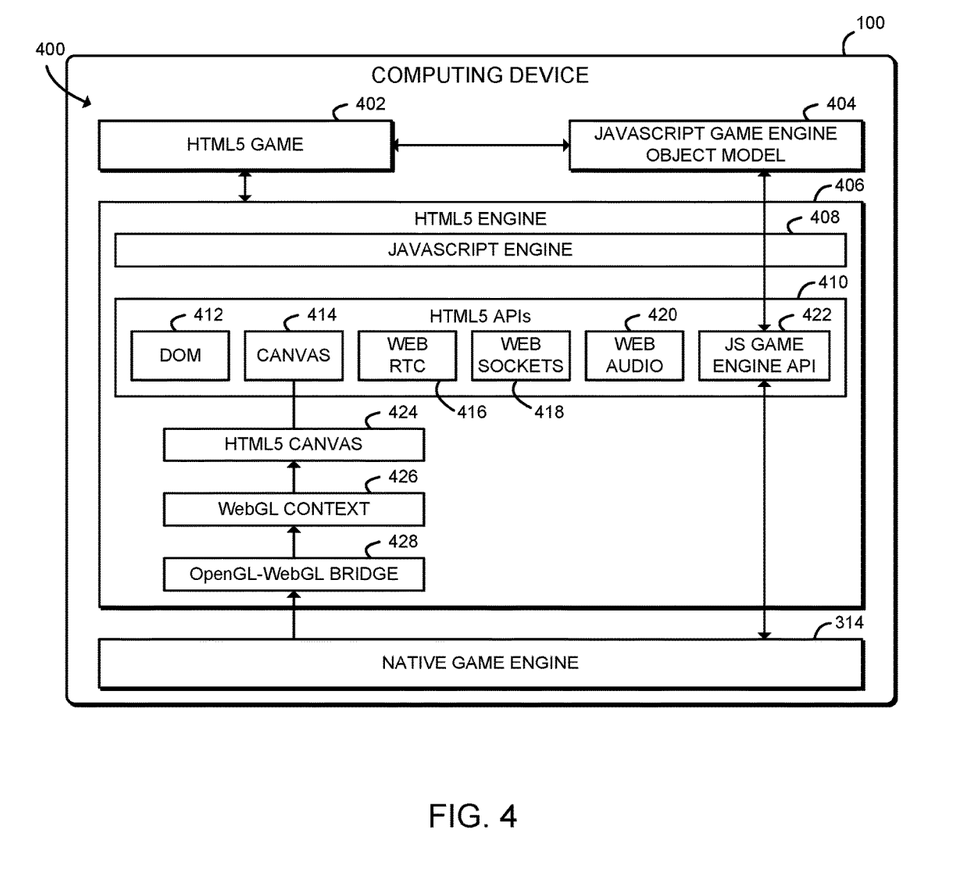
FIG. 4 is a simplified block diagram of at least one embodiment of an HTML5 system architecture that may be established by the computing device of FIGS. 1-3.

Referring now to FIG. 4, in the illustrative embodiment, the computing device 100 may establish a system architecture 400 during operation. The system architecture 400 illustrates at least one potential embodiment of the system architecture 300 that supports web content including HTML5 and JavaScript. As shown, the illustrative system architecture 400 includes the native game engine 314 as well as an HTML5 game 402, a JavaScript game engine object model 404, and an HTML5 engine 406. The HTML5 game 402 may include game code and resources such as HTML5 hypertext files, JavaScript script files, stylesheets, images, audio, and other resources. In particular, the HTML5 game 402 may include one or more JavaScript programs including game logic as well as one or more hypertext document elements that may be used to display graphical game content, such as a canvas element.

The JavaScript game engine object model 404 provides an object-oriented interface to the API provided by the native game engine 314. For example, the JavaScript game engine object model 404 may define JavaScript objects associated with game content such as scenes, levels, characters, transitions, animations, sprites, particle effects, three-dimensional models, or other game content. The JavaScript game engine object model 404 may also provide an event-based interface to the native game engine 314 using JavaScript events and/or event listeners. In the illustrative embodiment, the JavaScript game engine object model 404 may be embodied as one or more JavaScript libraries or other web scripting code. Additionally or alternatively, in some embodiments part or all of the JavaScript game engine object model 404 may be embodied as native code executed by the computing device 100.

The HTML5 engine 406 renders web content such as the HTML5 game 402. The HTML5 engine 406 may be embodied as a web browser, an application with an embedded web view component, or other graphical user interface of the computing device 100 capable of rendering HTML5 web content and associated web technologies. As shown, the HTML5 engine 406 establishes a JavaScript engine 408 and several HTML5 APIs 410. The JavaScript engine 408 executes JavaScript code, such as web scripts downloaded by the HTML5 engine 406. The JavaScript code may be included as part of a script element of a hypertext document, as a separate script file, or as any other resource available to the HTML5 engine 406. In the illustrative embodiment, the HTML5 engine 406 may execute JavaScript code associated with the HTML5 game 402 as well as the JavaScript game engine object model 404.

The HTML5 APIs 410 provide programmatic interfaces that allow web applications to access HTML5 features provided by the HTML5 engine 406, including multimedia rendering features, network communication features, audio features, and graphical features. Each of the HTML5 APIs 410 may be embodied as one or more JavaScript interfaces (including object definitions, functions, and/or other JavaScript features), document element interfaces (e.g., document type definitions, document element definitions, etc.), style sheet interfaces, and other web interfaces. In the illustrative embodiment, the HTML5 APIs 410 include a document object model (DOM) 412, a canvas API 414, a web real-time communication (RTC) API 416, a web sockets API 418, a web audio API 420, and a JavaScript game engine API 422. Of course, the HTML5 engine 406 may support additional HTML5 APIs 410 that are not illustrated.

The JavaScript game engine API 422 provides an imperative and/or procedural interface that exposes functions or other procedures corresponding to procedures of the native game engine 314. The JavaScript game engine API 422 may be embodied as an interface that closely parallels the interface of the native game engine 314. The JavaScript game engine API 422 receives calls from web scripts executed by the JavaScript engine 408 (for example, by the HTML5 game 402 and/or the JavaScript game engine object model 404) and calls corresponding procedures of the native game engine 314. The JavaScript game engine API 422 may call the native game engine 314 by executing one or more native function calls (e.g., function calls using a C or C++ calling convention or other similar native function call interface), by executing native bindings from a scripting language, or by otherwise invoking native code.

The HTML5 engine 406 further establishes an HTML5 canvas element 424, a WebGL context 426, and an OpenGL-WebGL bridge 428. The HTML5 canvas element 424 is an element of a hypertext document rendered by the HTML5 engine 406 that supports graphics rendering through the canvas API 414. In addition, the HTML5 canvas element 424 may be accessed using other HTML5 APIs 410 such as the DOM 412.

The WebGL context 426 may be embodied as an object or other interface provided by the HTML5 engine 406 to support OpenGL graphics rendering. The WebGL context 426 is associated with the canvas element 424, allowing the WebGL context 426 to render graphics to the canvas element 424. For example, the WebGL context 426 may be created for the canvas element 424 by executing one or more methods or other procedures of the canvas API 414.

The OpenGL-WebGL bridge 428 translates OpenGL calls to the WebGL context 426. The OpenGL-WebGL bridge 428 may establish a native interface that accepts OpenGL calls from the native game engine 314. In response to receiving a native OpenGL call, the OpenGL-WebGL bridge 428 may generate one or more corresponding calls to the WebGL context 426.

Figure 5:
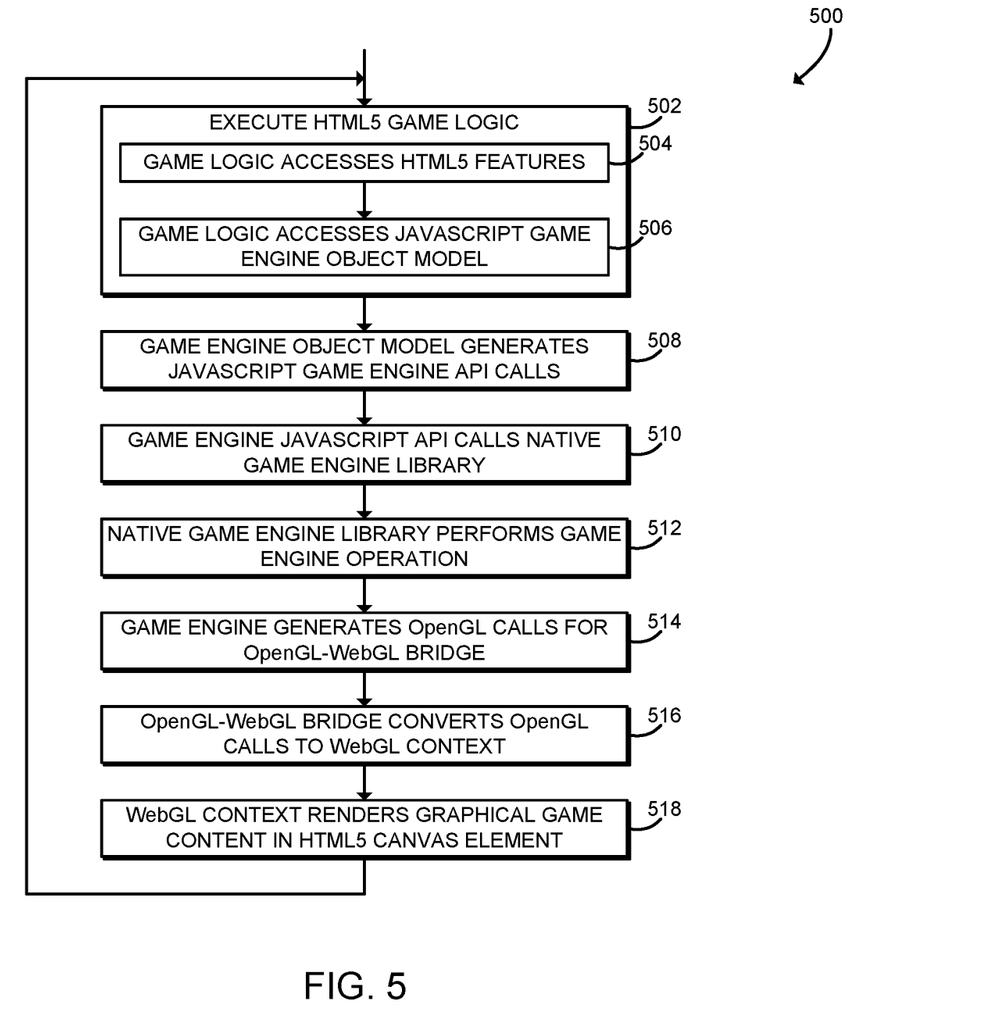
FIG. 5 is a simplified flow diagram of at least one embodiment of a method for web-based game execution that may be executed by the computing device of FIGS. 1-4.

Referring now to FIG. 5, in use, the computing device 100 may execute a method 500 for web game execution. The method 500 begins with block 502, in which the computing device 100 executes the HTML5 game logic of the HTML5 game 402. The game logic may perform any game logic tasks, such as controlling game logic flow, setting up and otherwise managing game objects such as game scenes, game levels, and game characters, setting up animations and transitions between game scenes, and otherwise controlling the HTML5 game 402. The game logic may be embodied as JavaScript or other web script executed by the JavaScript engine 408 of the HTML5 engine 406. In block 504, the game logic accesses one or more HTML5 features provided by the HTML5 engine 406. For example, the game logic may access one or more of the HTML5 APIs 410, such as the DOM 412, the canvas API 414, the web RTC API 416, the web sockets API 418, and/or the web audio API 420. In particular, the game logic may access the HTML5 features to control how the HTML5 game 402 is composited, rendered, or otherwise presented within a web document. In block 506, the game logic accesses the JavaScript game engine object model 404. For example, the game logic may access the JavaScript game engine object model 404 to set up or otherwise manage game objects such as game scenes, game levels, game characters, transitions, animations, and other game objects. The game logic may also set up or otherwise manage graphical game content such as sprites, particle effects, three dimensional models and textures, and other graphical features of the HTML5 game 402. As described above, the JavaScript game engine object model 404 provides an object-oriented interface to the JavaScript game engine API 422 of the HTML5 engine 406. In some embodiments, the JavaScript game engine object model 404 may be embodied as one or more JavaScript libraries or other scripting code executed by the JavaScript engine 408. Additionally or alternatively, in some embodiments part or all of the JavaScript game engine API 422 may be embodied as native code of the HTML5 engine 406.

In block 508, the JavaScript game engine object model 404 generates one or more calls to the JavaScript game engine API 422 established by the HTML5 engine 406. For example, the JavaScript game engine object model 404 may convert method calls and/or other interactions between game engine objects of the JavaScript game engine object model 404 into corresponding function calls to the JavaScript game engine API 422. The JavaScript game engine API 422 may be embodied as an interface that closely parallels the interface of the native game engine 314. For example, the JavaScript game engine API 422 may provide an imperative and/or procedural interface that exposes functions or other procedures corresponding to procedures of the native game engine 314. Although illustrated as invoking the JavaScript game engine API 422 through the JavaScript game engine object model 404, it should be understood that in some embodiments the HTML5 game 402 may access the JavaScript game engine API 422 directly.

In block 510, the JavaScript game engine API 422 calls the native game engine 314. As described above, in response to receive a procedure call from the JavaScript game engine object model 404, the JavaScript game engine API 422 may call a corresponding procedure of the native game engine 314. The JavaScript game engine API 422 may call the native game engine 314 by executing one or more native function calls (e.g., executing a function call using a C or C++ calling convention or other similar native function call interface), by executing native bindings from a scripting language, or by otherwise invoking native code.

In block 512, the native game engine 314 performs one or more game engine operations based on the native calls received from the JavaScript game engine API 422. For example, the native game engine 314 may update a game scene including game objects such as game characters, transitions, animations, and other game objects. In some embodiments, the native game engine 314 may perform additional processing, including performing physics calculations, processing user input data, or providing other game services.

In block 514, the native game engine 314 generates one or more OpenGL calls to the OpenGL-WebGL bridge 428. The native game engine 314 may generate the OpenGL calls while drawing a game scene or other graphical game content. For example, the native game engine 314 may generate the OpenGL calls to display sprites, particle effects, backgrounds, three-dimensional models and textures, and/or other graphical game content. The OpenGL calls may be embodied as one or more native function calls or other invocations of an OpenGL library. Additionally or alternatively, although illustrated as generating OpenGL calls, it should be understood that in some embodiments the native game engine 314 may generate calls to any native graphics library of the computing device 100.

In block 516, the OpenGL-WebGL bridge 428 converts the OpenGL calls received from the native game engine 314 to the WebGL context 426. For example, the OpenGL-WebGL bridge 428 may receive an OpenGL call from the native game engine 314 and then generate a corresponding call to the WebGL context 426. As described above, the WebGL context 426 may be embodied as an object or other interface provided by the HTML5 engine 406 to support OpenGL graphics rendering. Additionally or alternatively, although illustrated as converting the OpenGL calls to a WebGL context 426, it should be understood that in some embodiments the OpenGL-WebGL bridge 428 may generate calls to a different interface of the HTML5 rendering engine 406 that corresponds to the native graphics library expected by the native game engine 314.

In block 518, the WebGL context 426 renders the graphical game content to the HTML5 canvas element 424. The HTML5 canvas element 424 is an element of a hypertext document rendered by the HTML5 engine 406 that supports graphics rendering through the canvas API 414. The HTML5 engine 406 also supports creating the WebGL context 426 based on the canvas element 424, allowing the WebGL context 426 to render to the canvas element 424. In addition, the HTML5 engine 406 supports accessing the HTML5 canvas element 424 using other HTML5 APIs 410 and associated web technologies. In particular, the HTML5 canvas element 424 may be manipulated and otherwise accessed using a document object model (DOM) 412 and/or the canvas API 414 established by the HTML5 engine 406. After rendering the graphical game content to the canvas element 424, the method 500 loops back to block 502 to continue executing the HTML5 game logic.

It should be appreciated that, in some embodiments, the method 500 may be embodied as various instructions stored on a computer-readable media, which may be executed by the processor 120, a peripheral device 132, and/or other components of the computing device 100 to cause the computing device 100 to perform the corresponding method 500. The computer-readable media may be embodied as any type of media capable of being read by the computing device 100 including, but not limited to, the memory 124, the data storage device 126, a local memory of the processor 120, other memory or data storage devices of the computing device 100, portable media readable by a peripheral device 132 of the computing device 100, and/or other media.

EXAMPLES

Illustrative examples of the technologies disclosed herein are provided below. An embodiment of the technologies may include any one or more, and any combination of, the examples described below.

Example 1 includes a computing device for web game execution, the computing device comprising: a game engine object model module to issue, by a scripting environment established by a web rendering engine of the computing device, a first call to a game engine interface established by the web rendering engine; a game engine binding module to (i) issue a second call to a native game engine library of the computing device in response to issuance of the first call to the game engine interface and (ii) issue, by the native game engine library, a native graphics command to a graphics bridge of the computing device in response to issuance of the second call to the native game engine library; and a graphics bridge module to (i) translate, by the graphics bridge, the native graphics command to a web graphics context in response to issuance of the native graphics command to the graphics bridge and (ii) render graphical game content to a web content element of the web rendering engine with the web graphics context in response to translation of the native graphics command to the web graphics context.

Example 2 includes the subject matter of Example 1, and wherein: the game engine binding module is further to translate, by the game engine interface, the first call to the game engine interface into the second call to the native game engine library; wherein to issue the second call to the native game engine library comprises to issue the second call to the native game engine library in response to translation of the first call into the second call.

Example 3 includes the subject matter of any of Examples 1 and 2, and wherein to issue the first call to the game engine interface established by the web rendering engine of the computing device comprises to: issue a sprite command, issue an animation command, issue an input device command, issue a physics engine command, or issue a three-dimensional animation command.

Example 4 includes the subject matter of any of Examples 1-3, and wherein: the game engine object model module is further to access, by the web scripting environment, a game engine object model established by the web scripting environment; wherein to issue the first call to the game engine interface comprises to issue the first call to the game engine interface in response to an accessing of the game engine object model.

Example 5 includes the subject matter of any of Examples 1-4, and wherein the game engine object model comprises an abstracted model of the game engine interface that is adapted to the web scripting environment.

Example 6 includes the subject matter of any of Examples 1-5, and wherein the game engine object model module is further to execute game logic by the web scripting environment, wherein to execute the game logic comprises to issue the first call to the game engine interface.

Example 7 includes the subject matter of any of Examples 1-6, and wherein to execute the game logic by the web scripting environment further comprises to issue, by the web scripting environment, a third call to a web application programming interface established by the web rendering engine.

Example 8 includes the subject matter of any of Examples 1-7, and wherein the web application programming interface comprises a document object model, a web real-time communication interface, a web sockets interface, or a web audio interface.

Example 9 includes the subject matter of any of Examples 1-8, and wherein: the scripting environment established by the web rendering engine comprises a JavaScript engine; the first call to the game engine interface comprises a JavaScript function call to the game engine interface; and the second call to the native game engine library comprises a native function call to the native game engine library.

Example 10 includes the subject matter of any of Examples 1-9, and wherein the native graphics command comprises a native graphics library command.

Example 11 includes the subject matter of any of Examples 1-10, and wherein the web content element of the web rendering engine comprises a document element of a textual markup language document.

Example 12 includes the subject matter of any of Examples 1-11, and wherein the document element of the textual markup language document comprises a canvas element.

Example 13 includes the subject matter of any of Examples 1-12, and wherein the graphical game content comprises a sprite, a particle effect, or a three-dimensional model.

Example 14 includes the subject matter of any of Examples 1-13, and wherein the graphics bridge module is further to render, by a web browser of the computing device, the web content element in response to a rendering of the graphical game content, wherein the web browser comprises the web rendering engine.

Example 15 includes a method for web game execution, the method comprising: issuing, by a scripting environment established by a web rendering engine of a computing device, a first call to a game engine interface established by the web rendering engine; issuing, by the computing device, a second call to a native game engine library of the computing device in response to issuing the first call to the game engine interface; issuing, by the native game engine library, a native graphics command to a graphics bridge of the computing device in response to issuing the second call to the native game engine library; translating, by the graphics bridge, the native graphics command to a web graphics context in response to issuing the native graphics command to the graphics bridge; and rendering, by the computing device, graphical game content to a web content element of the web rendering engine using the web graphics context in response to translating the native graphics command to the web graphics context.

Example 16 includes the subject matter of Example 15, and further comprising: translating, by the game engine interface, the first call to the game engine interface into the second call to the native game engine library; wherein issuing the second call to the native game engine library comprises issuing the second call to the native game engine library in response to translating the first call into the second call.

Example 17 includes the subject matter of any of Examples 15 and 16, and wherein issuing the first call to the game engine interface established by the web rendering engine of the computing device comprises issuing a sprite command, issuing an animation command, issuing an input device command, issuing a physics engine command, or issuing a three-dimensional animation command.

Example 18 includes the subject matter of any of Examples 15-17, and further comprising: accessing, by the web scripting environment, a game engine object model established by the web scripting environment; wherein issuing the first call to the game engine interface comprises issuing the first call to the game engine interface in response to accessing the game engine object model.

Example 19 includes the subject matter of any of Examples 15-18, and wherein the game engine object model comprises an abstracted model of the game engine interface that is adapted to the web scripting environment.

Example 20 includes the subject matter of any of Examples 15-19, and further comprising executing game logic by the web scripting environment, wherein executing the game logic comprises issuing the first call to the game engine interface.

Example 21 includes the subject matter of any of Examples 15-20, and wherein executing the game logic by the web scripting environment further comprises issuing, by the web scripting environment, a third call to a web application programming interface established by the web rendering engine.

Example 22 includes the subject matter of any of Examples 15-21, and wherein issuing the third call to the web application programming interface comprises issuing the third call to a document object model, a web real-time communication interface, a web sockets interface, or a web audio interface.

Example 23 includes the subject matter of any of Examples 15-22, and wherein: the scripting environment established by the web rendering engine comprises a JavaScript engine; issuing the first call to the game engine interface established by the web rendering engine comprises executing a JavaScript function call to the game engine interface; and issuing the second call to the native game engine library comprises executing a native function call to the native game engine library.

Example 24 includes the subject matter of any of Examples 15-23, and wherein issuing the native graphics command to the graphics bridge comprises executing a native graphics library command.

Example 25 includes the subject matter of any of Examples 15-24, and wherein rendering the graphical game content to the web content element of the web rendering engine comprises rendering the graphical game content to a document element of a textual markup language document.

Example 26 includes the subject matter of any of Examples 15-25, and wherein rendering the graphical game content to the document element of the textual markup language document comprises rendering the graphical game content to a canvas element.

Example 27 includes the subject matter of any of Examples 15-26, and wherein rendering the graphical game content to the web content element of the web rendering engine comprises rendering a sprite, rendering a particle effect, or rendering a three-dimensional model.

Example 28 includes the subject matter of any of Examples 15-27, and further comprising rendering, by a web browser of the computing device, the web content element in response to rendering the graphical game content, wherein the web browser comprises the web rendering engine.

Example 29 includes a computing device comprising: a processor; and a memory having stored therein a plurality of instructions that when executed by the processor cause the computing device to perform the method of any of Examples 15-28.

Example 30 includes one or more machine readable storage media comprising a plurality of instructions stored thereon that in response to being executed result in a computing device performing the method of any of Examples 15-28.

Example 31 includes a computing device comprising means for performing the method of any of Examples 15-28.

Example 32 includes a computing device for web game execution, the computing device comprising: means for issuing, by a scripting environment established by a web rendering engine of the computing device, a first call to a game engine interface established by the web rendering engine; means for issuing a second call to a native game engine library of the computing device in response to issuing the first call to the game engine interface; means for issuing, by the native game engine library, a native graphics command to a graphics bridge of the computing device in response to issuing the second call to the native game engine library; means for translating, by the graphics bridge, the native graphics command to a web graphics context in response to issuing the native graphics command to the graphics bridge; and means for rendering graphical game content to a web content element of the web rendering engine using the web graphics context in response to translating the native graphics command to the web graphics context.

Example 33 includes the subject matter of Example 32, and further comprising: means for translating, by the game engine interface, the first call to the game engine interface into the second call to the native game engine library; wherein the means for issuing the second call to the native game engine library comprises means for issuing the second call to the native game engine library in response to translating the first call into the second call.

Example 34 includes the subject matter of any of Examples 32 and 33, and wherein the means for issuing the first call to the game engine interface established by the web rendering engine of the computing device comprises means for issuing a sprite command, issuing an animation command, issuing an input device command, issuing a physics engine command, or issuing a three-dimensional animation command.

Example 35 includes the subject matter of any of Examples 32-34, and further comprising: means for accessing, by the web scripting environment, a game engine object model established by the web scripting environment; wherein the means for issuing the first call to the game engine interface comprises means for issuing the first call to the game engine interface in response to accessing the game engine object model.

Example 36 includes the subject matter of any of Examples 32-35, and wherein the game engine object model comprises an abstracted model of the game engine interface that is adapted to the web scripting environment.

Example 37 includes the subject matter of any of Examples 32-36, and further comprising means for executing game logic by the web scripting environment, wherein the means for executing the game logic comprises means for issuing the first call to the game engine interface.

Example 38 includes the subject matter of any of Examples 32-37, and wherein the means for executing the game logic by the web scripting environment further comprises means for issuing, by the web scripting environment, a third call to a web application programming interface established by the web rendering engine.

Example 39 includes the subject matter of any of Examples 32-38, and wherein the means for issuing the third call to the web application programming interface comprises means for issuing the third call to a document object model, a web real-time communication interface, a web sockets interface, or a web audio interface.

Example 40 includes the subject matter of any of Examples 32-39, and wherein: the scripting environment established by the web rendering engine comprises a JavaScript engine; the means for issuing the first call to the game engine interface established by the web rendering engine comprises means for executing a JavaScript function call to the game engine interface; and the means for issuing the second call to the native game engine library comprises means for executing a native function call to the native game engine library.

Example 41 includes the subject matter of any of Examples 32-40, and wherein the means for issuing the native graphics command to the graphics bridge comprises means for executing a native graphics library command.

Example 42 includes the subject matter of any of Examples 32-41, and wherein the means for rendering the graphical game content to the web content element of the web rendering engine comprises means for rendering the graphical game content to a document element of a textual markup language document.

Example 43 includes the subject matter of any of Examples 32-42, and wherein the means for rendering the graphical game content to the document element of the textual markup language document comprises means for rendering the graphical game content to a canvas element.

Example 44 includes the subject matter of any of Examples 32-43, and wherein the means for rendering the graphical game content to the web content element of the web rendering engine comprises means for rendering a sprite, rendering a particle effect, or rendering a three-dimensional model.

Example 45 includes the subject matter of any of Examples 32-44, and further comprising means for rendering, by a web browser of the computing device, the web content element in response to rendering the graphical game content, wherein the web browser comprises the web rendering engine.

The invention claimed is:

1. A computing device for web game execution, the computing device comprising:
    a game engine object model module to issue, by a scripting environment established by a web rendering engine of the computing device, a first call to a game engine interface established by the web rendering engine;
    a game engine binding module to (i) issue a second call to a native game engine library of the computing device in response to issuance of the first call to the game engine interface, (ii) perform, by the native game engine library, a game engine operation in response to issuance of the second call, wherein the native game engine library comprises a native code library for the computing device, and (iii) issue, by the native game engine library, a native graphics command to a graphics bridge of the computing device in response to performance of the game engine operation by the native game engine library, wherein the native graphics command comprises a native graphics library command; and
    a graphics bridge module to (i) translate, by the graphics bridge, the native graphics command to a web graphics context in response to issuance of the native graphics command to the graphics bridge and (ii) render graphical game content to a web content element of the web rendering engine with the web graphics context in response to translation of the native graphics command to the web graphics context.

2. The computing device of claim 1, wherein:
    the game engine binding module is further to translate, by the game engine interface, the first call to the game engine interface into the second call to the native game engine library;
    wherein to issue the second call to the native game engine library comprises to issue the second call to the native game engine library in response to translation of the first call into the second call.

3. The computing device of claim 1, wherein:
the game engine object model module is further to access, by the web scripting environment, a game engine object model established by the web scripting environment;
wherein to issue the first call to the game engine interface comprises to issue the first call to the game engine interface in response to an accessing of the game engine object model.

4. The computing device of claim 3, wherein the game engine object model comprises an abstracted model of the game engine interface that is adapted to the web scripting environment.

5. The computing device of claim 1, wherein the game engine object model module is further to execute game logic by the web scripting environment, wherein to execute the game logic comprises to issue the first call to the game engine interface.

6. The computing device of claim 5, wherein to execute the game logic by the web scripting environment further comprises to issue, by the web scripting environment, a third call to a web application programming interface established by the web rendering engine.

7. The computing device of claim 1, wherein the web content element of the web rendering engine comprises a document element of a textual markup language document, and wherein the document element is accessible by a document object model established by the web rendering engine.

8. The computing device of claim 7, wherein the document element of the textual markup language document comprises a canvas element.

9. The computing device of claim 1, wherein the graphics bridge module is further to render, by a web browser of the computing device, the web content element in response to a rendering of the graphical game content, wherein the web browser comprises the web rendering engine.

10. A method for web game execution, the method comprising:
issuing, by a scripting environment established by a web rendering engine of a computing device, a first call to a game engine interface established by the web rendering engine;
issuing, by the computing device, a second call to a native game engine library of the computing device in response to issuing the first call to the game engine interface;
performing, by the native game engine library, a game engine operation in response to issuing the second call, wherein the native game engine library comprises a native code library for the computing device;
issuing, by the native game engine library, a native graphics command to a graphics bridge of the computing device in response to performing the game engine operation by the native game engine library, wherein the native graphics command comprises a native graphics library command;
translating, by the graphics bridge, the native graphics command to a web graphics context in response to issuing the native graphics command to the graphics bridge; and
rendering, by the computing device, graphical game content to a web content element of the web rendering engine using the web graphics context in response to translating the native graphics command to the web graphics context.

11. The method of claim 10, further comprising:
translating, by the game engine interface, the first call to the game engine interface into the second call to the native game engine library;
wherein issuing the second call to the native game engine library comprises issuing the second call to the native game engine library in response to translating the first call into the second call.

12. The method of claim 10, further comprising:
accessing, by the web scripting environment, a game engine object model established by the web scripting environment;
wherein issuing the first call to the game engine interface comprises issuing the first call to the game engine interface in response to accessing the game engine object model.

13. The method of claim 10, further comprising executing game logic by the web scripting environment, wherein executing the game logic comprises issuing the first call to the game engine interface.

14. The method of claim 13, wherein executing the game logic by the web scripting environment further comprises issuing, by the web scripting environment, a third call to a web application programming interface established by the web rendering engine.

15. The method of claim 10, wherein rendering the graphical game content to the web content element of the web rendering engine comprises rendering the graphical game content to a document element of a textual markup language document, wherein the document element is accessible by a document object model established by the web rendering engine.

16. The method of claim 10, further comprising rendering, by a web browser of the computing device, the web content element in response to rendering the graphical game content, wherein the web browser comprises the web rendering engine.

17. One or more non-transitory, machine readable storage media comprising a plurality of instructions that in response to being executed cause a computing device to:
issue, by a scripting environment established by a web rendering engine of the computing device, a first call to a game engine interface established by the web rendering engine;
issue a second call to a native game engine library of the computing device in response to issuing the first call to the game engine interface;
perform, by the native game engine library, a game engine operation in response to issuing the second call, wherein the native game engine library comprises a native code library for the computing device;
issue, by the native game engine library, a native graphics command to a graphics bridge of the computing device in response to performing the game engine operation by the native game engine library, wherein the native graphics command comprises a native graphics library command;
translate, by the graphics bridge, the native graphics command to a web graphics context in response to issuing the native graphics command to the graphics bridge; and
render graphical game content to a web content element of the web rendering engine using the web graphics context in response to translating the native graphics command to the web graphics context.

18. The one or more non-transitory, machine readable storage media of claim 17, further comprising a plurality of instructions that in response to being executed cause the computing device to:

translate, by the game engine interface, the first call to the game engine interface into the second call to the native game engine library;

wherein to issue the second call to the native game engine library comprises to issue the second call to the native game engine library in response to translating the first call into the second call.

19. The one or more non-transitory, machine readable storage media of claim 17, further comprising a plurality of instructions that in response to being executed cause the computing device to:

access, by the web scripting environment, a game engine object model established by the web scripting environment;

wherein to issue the first call to the game engine interface comprises to issue the first call to the game engine interface in response to accessing the game engine object model.

20. The one or more non-transitory, machine readable storage media of claim 17, further comprising a plurality of instructions that in response to being executed cause the computing device to execute game logic by the web scripting environment, wherein to execute the game logic comprises to issue the first call to the game engine interface.

21. The one or more non-transitory, machine readable storage media of claim 20, wherein to execute the game logic by the web scripting environment further comprises to issue, by the web scripting environment, a third call to a web application programming interface established by the web rendering engine.

22. The one or more non-transitory, machine readable storage media of claim 17, wherein to render the graphical game content to the web content element of the web rendering engine comprises to render the graphical game content to a document element of a textual markup language document, wherein the document element is accessible by a document object model established by the web rendering engine.

23. The one or more non-transitory, machine readable storage media of claim 17, further comprising a plurality of instructions that in response to being executed cause the computing device to render, by a web browser of the computing device, the web content element in response to rendering the graphical game content, wherein the web browser comprises the web rendering engine.

* * * * *